Figure 1:
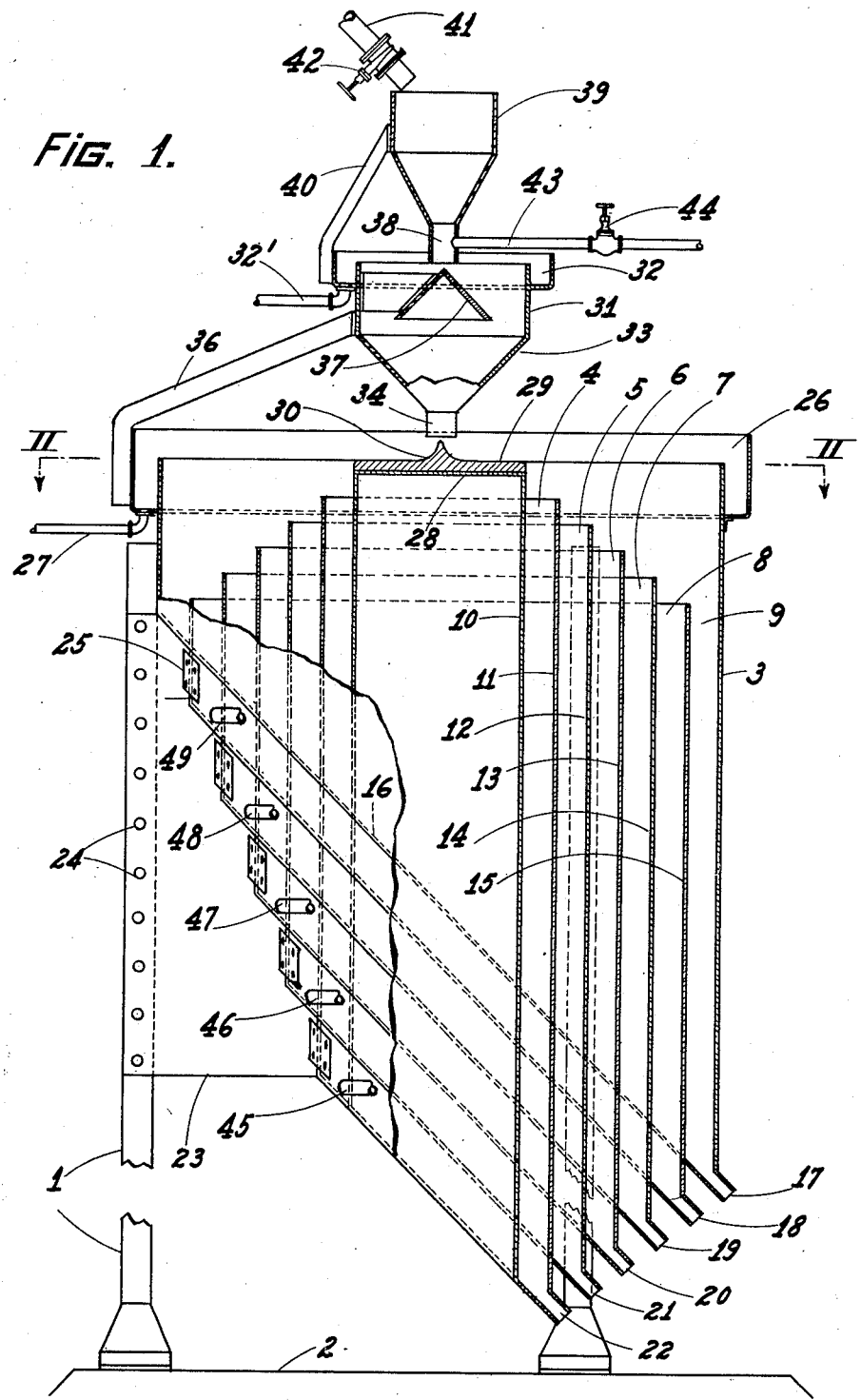

Oct. 9, 1923. 1,470,531
M. HOKANSON
APPARATUS FOR CLASSIFYING GRANULAR MATERIALS
Filed May 10, 1922 6 Sheets-Sheet 2

WITNESSES

INVENTOR
Martin Hokanson
By Winter & Brown
ATTORNEYS

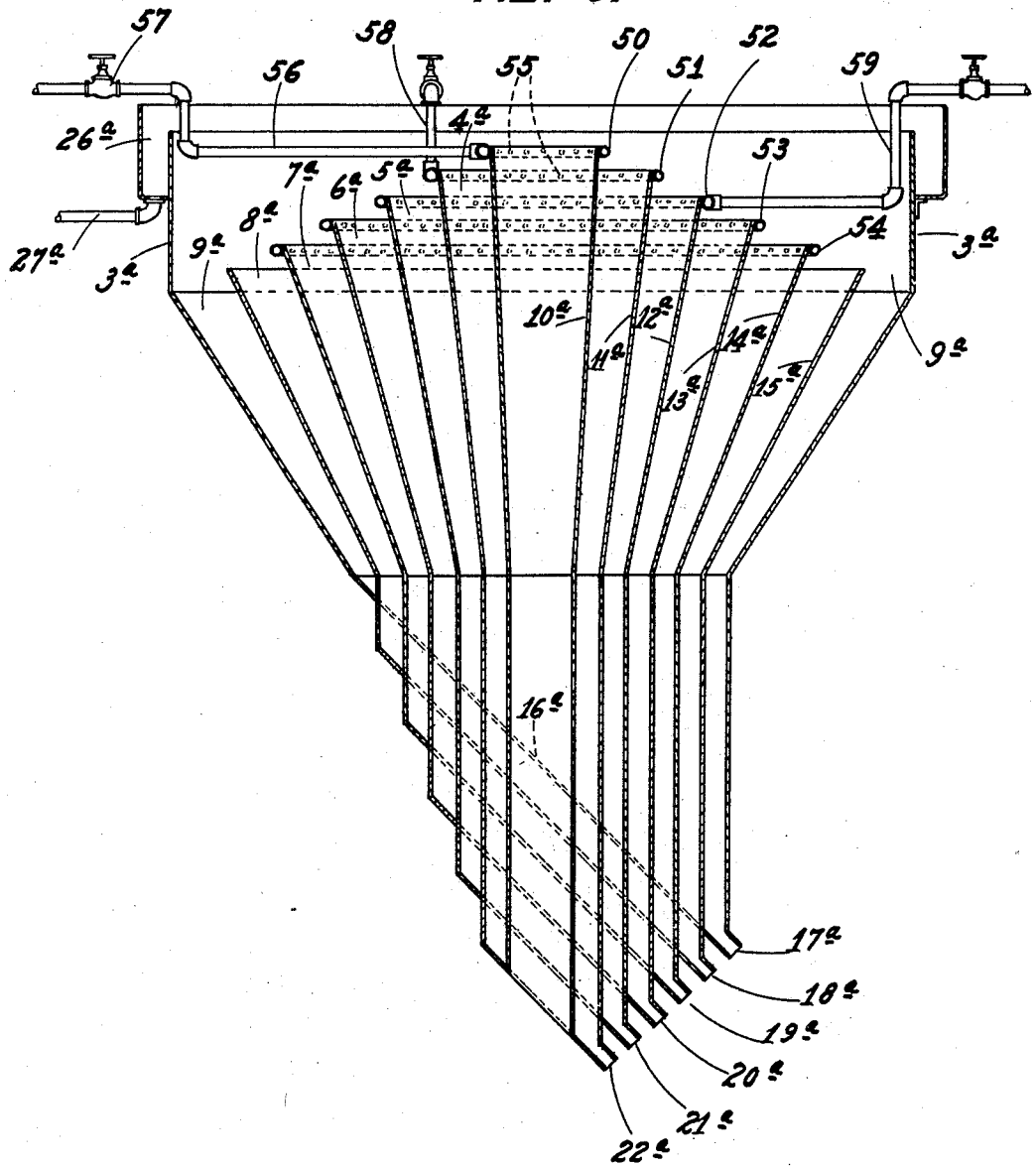

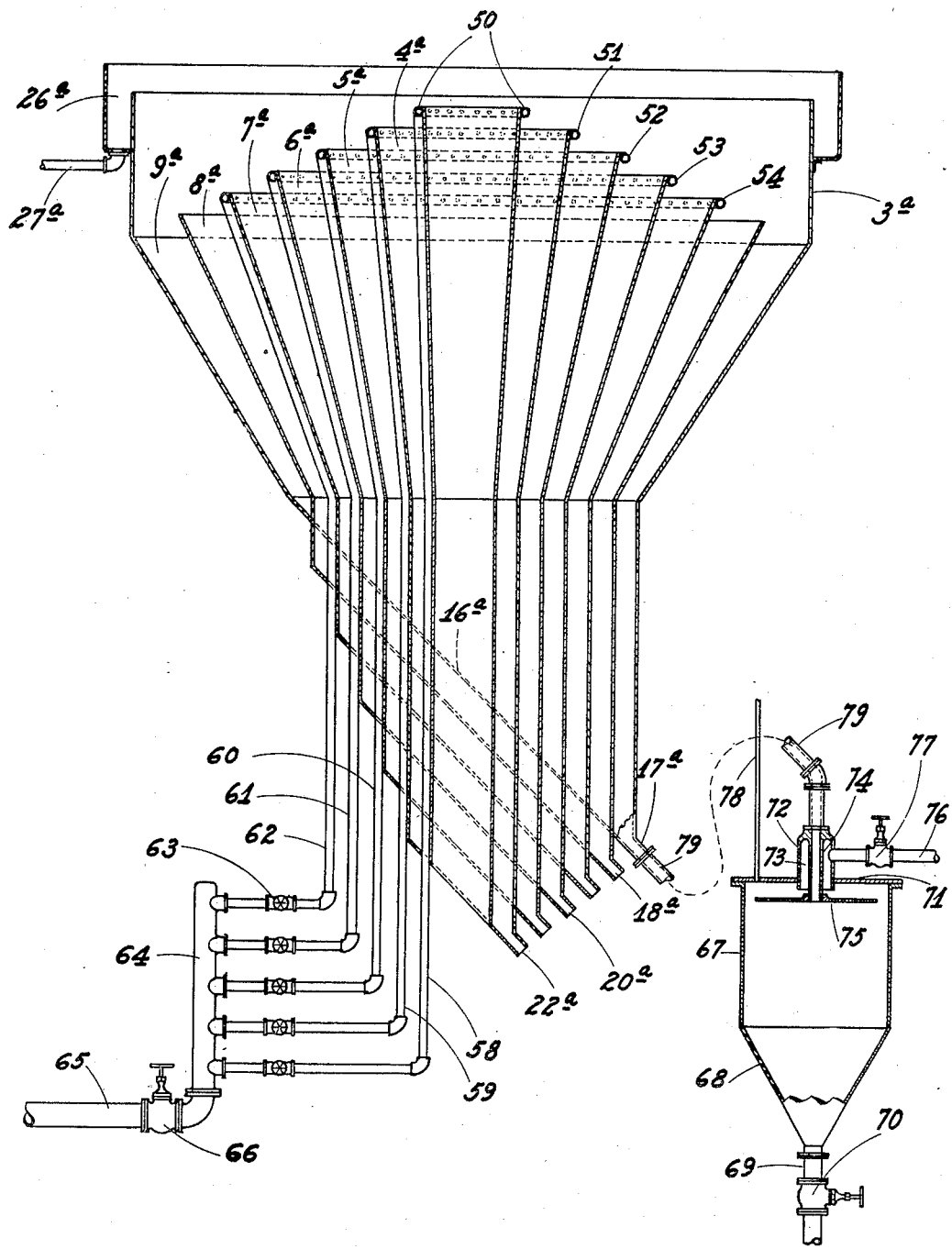

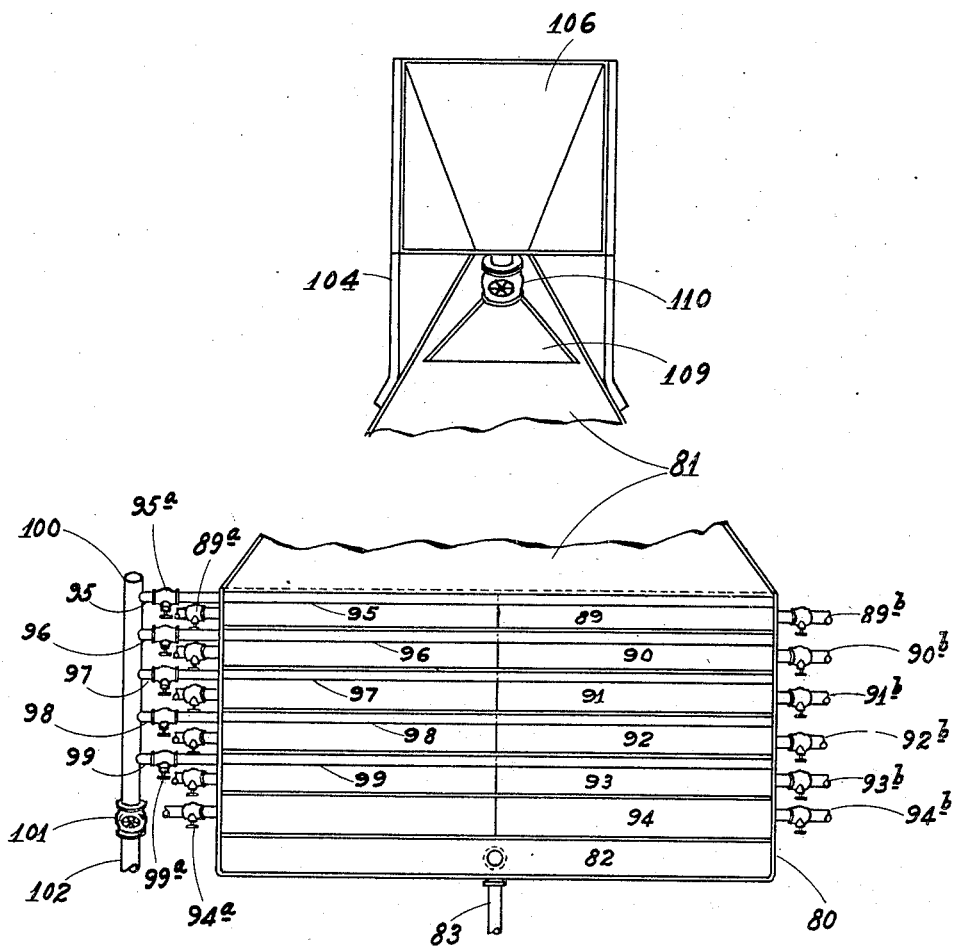

Oct. 9, 1923.
M. HOKANSON
1,470,531
APPARATUS FOR CLASSIFYING GRANULAR MATERIALS
Filed May 10 1922   6 Sheets-Sheet 6
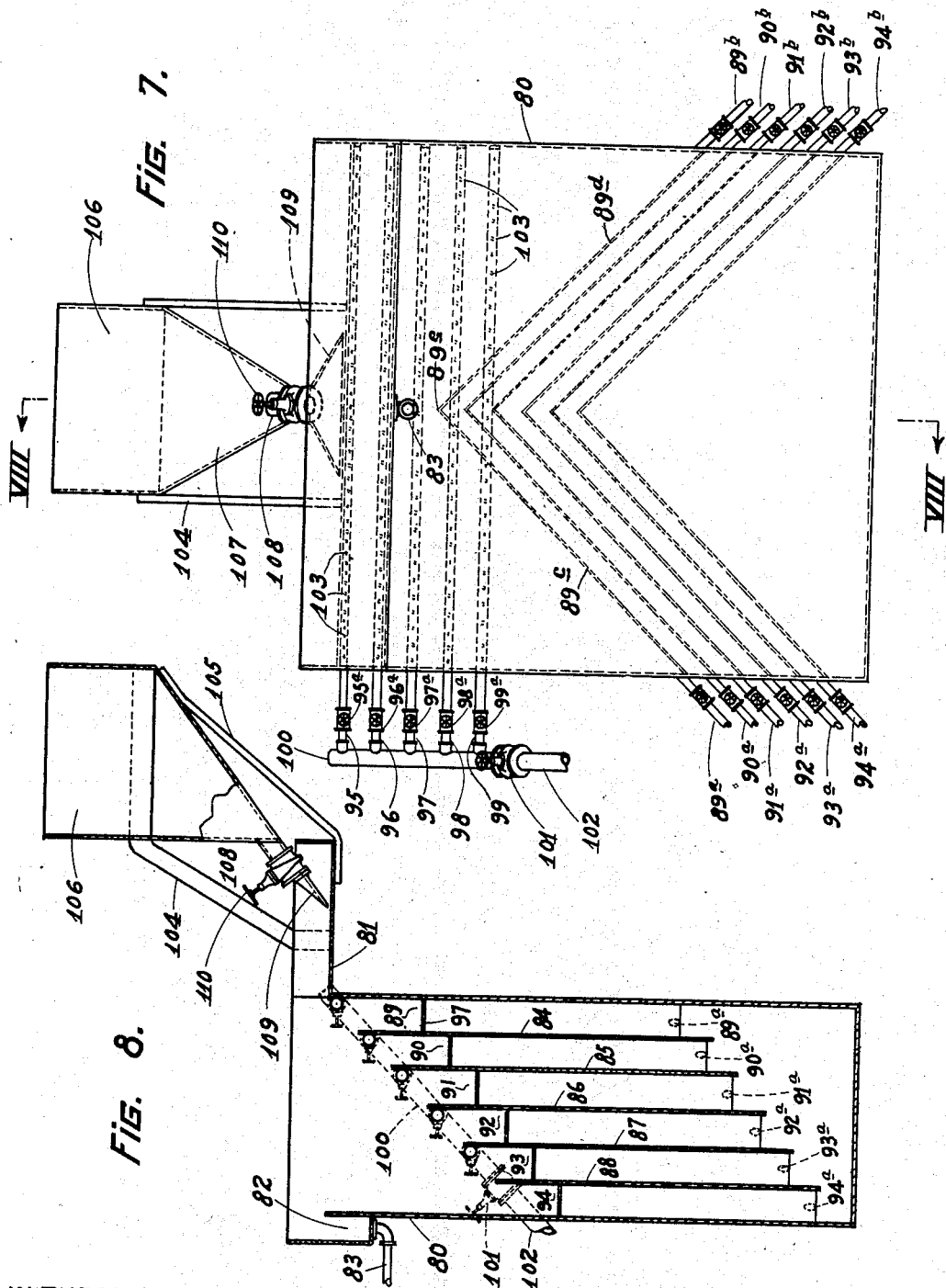
WITNESSES
a B Wallace
CR Halbert
INVENTOR
Martin Hokanson
by Winter & Brown
ATTORNEYS Patented Oct. 9, 1923.

1,470,531

UNITED STATES PATENT OFFICE.

MARTIN HOKANSON, OF DULUTH, MINNESOTA.

APPARATUS FOR CLASSIFYING GRANULAR MATERIALS.

Application filed May 10, 1922. Serial No. 559,727.

*To all whom it may concern:*

Be it known that I, MARTIN HOKANSON, a citizen of the United States, and a resident of Duluth, in the county of St. Louis and State of Minnesota, have invented a new and useful Improvement in Apparatus for Classifying Granular Materials, of which the following is a specification.

This invention relates to an apparatus for classifying granular material and has for an object the provision of a device that will readily and efficiently effect the separation of the particles comprising a granular material into grades or classes according to their respective sizes and specific gravities.

Although the device is adapted to general use wherever it is desirable to effect a separation or classification according to the size and specific gravity of the particles comprising the material, it is particularly adapted and intended for use in connection with the separation of the valuable parts of ore from gangue. Special objects are to provide a device for effecting the desired purpose void of screens or shaking tables, one in which the materials will be sharply separated, one which possesses a large capacity of production without detracting from its effective operation to produce a sharp separation, one which is void of sorting columns and "teetering" incident thereto, one which requires the minimum quantity of water to operate, and one which is simple in construction, easy to operate and repair, and economical to manufacture.

The invention utilizes the principle that if solid particles of the same size but of different specific gravities or weights or particles of the same specific gravity but of different sizes are subjected to the influence of a horizontal flowing stream of water of decreasing velocity, the lighter and smaller particles will be carried to a greater distance than the heavier and larger particles, and the distances the individual particles are carried vary according to their relative specific gravities and sizes. It is a special object of the invention to provide a device which not only utilizes the above principle but in which an enhanced and sharper separation is effected than in previously known devices by subjecting the particles tending to collect within a certain zone to lateral impacts produced by the admission of inflowing streams of sufficient velocity to deflect the lighter and smaller particles while not affecting the heavier and larger ones.

It is also a further object to provide a device of the character set forth in which the several grades into which the material is separated are collected by a series of suitably disposed compartments so positioned and arranged with relation to the remaining parts as to offer the minimum obstruction to the passage of the separated materials therethrough.

Although the apparatus is capable of use for classifying or grading materials generally comprising particles of varying sizes and specific gravities, it is particularly intended for use in connection with mixtures of valuable minerals and gangue, and for that reason will be particularly described in connection with the treatment of such material.

These and other objects of the invention will more readily appear when taken in connection with the following description and the appended claims.

Figure 4:
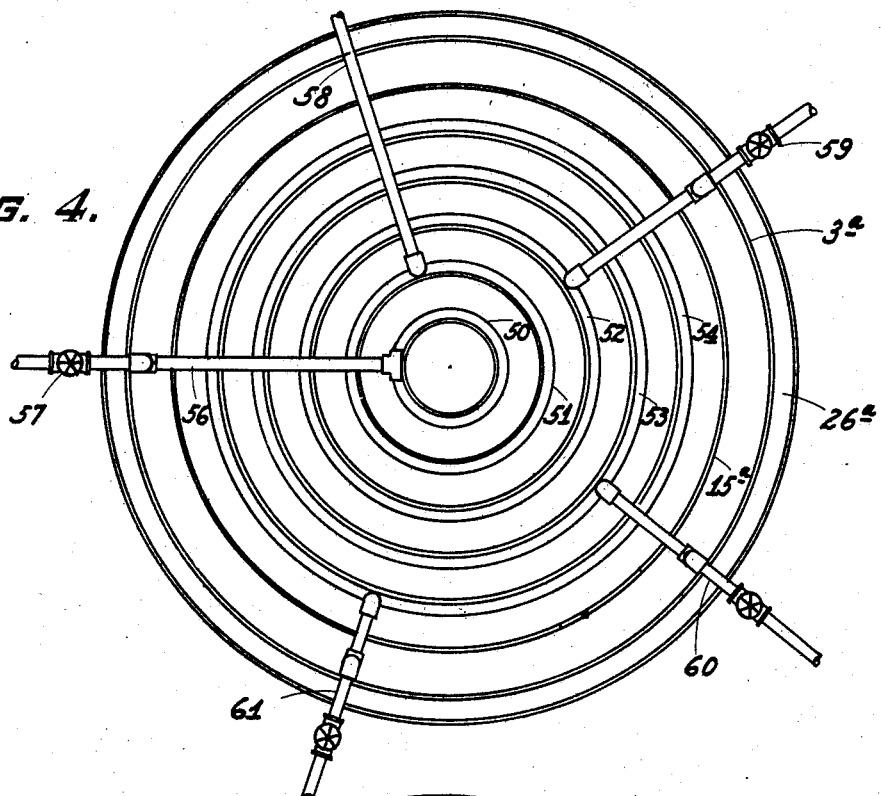
Figure 2:
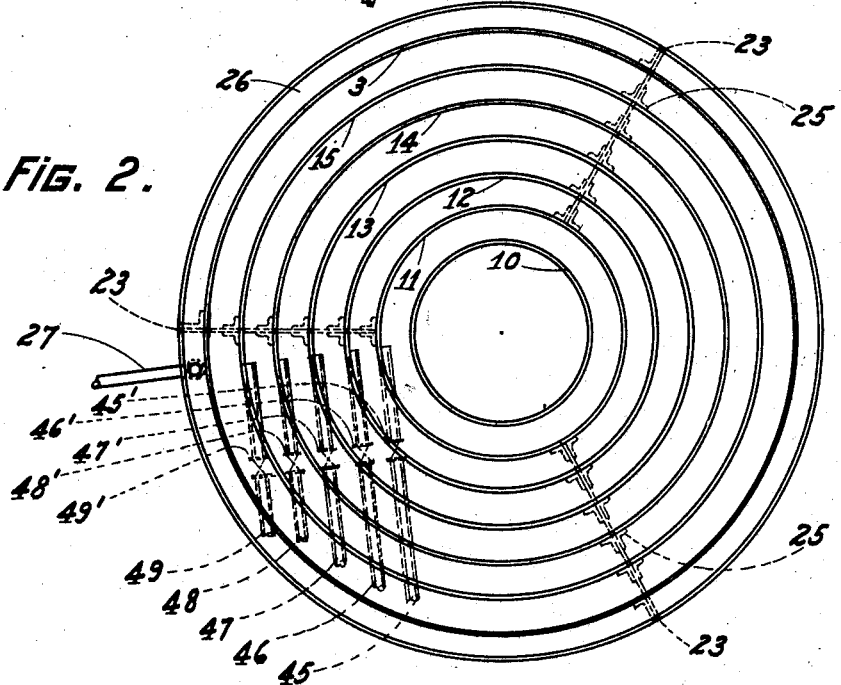

In the accompanying drawings Fig. 1 is a vertical sectional view with parts in elevation illustrating one form of apparatus embodying the invention; Fig. 2 a transverse sectional view taken on the line II—II of Fig. 1; Fig. 3 a fragmentary vertical sectional view illustrating a modified form of the tank and collecting compartments; Fig. 4 a plan view of the device illustrated in Fig. 3; Fig. 5 a sectional view of a further modified form of tank and collecting compartments, also illustrating a settling tank to which the separated material is delivered; Fig. 6 a plan view of a still further modified form embodying the invention; Fig. 7, an end elevation of the device illustrated in Fig. 6; Fig. 8, a vertical sectional view taken on line VIII—VIII of Fig. 7.

In the form of apparatus shown in Figs. 1 and 2, 1 are upright frame members mounted upon a suitable base 2 for supporting the tank 3 with its associated annular collecting compartments. These compartments are coaxial with the tank 3 and are concentrically arranged, being designated as 4, 5, 6, 7, 8 and 9 respectively, and are formed by spaced cylindrical walls indicated at 10, 11, 12, 13, 14 and 15 respectively.

As clearly shown in Fig. 1, the inner wall of each compartment forms the outer wall of the adjacent compartment surrounding the same, and the upper extremity of each successive wall, and consequently the upper end of each succeeding compartment beginning with the inner compartment, terminates in a plane located at a slightly lower level. Tank 3 is provided with an inclined floor 16 forming the bottom of the compartment 9 which slopes downwardly towards an outlet 17 disposed at its lowest point, and each of the collecting compartments have correspondingly formed bottoms which slope towards similar outlets designated as 18, 19, 20, 21 and 22 respectively. The outer wall of each compartment extends through and below the bottom of the adjacent compartment surrounding it, forming a nested arrangement. All of the compartments thus assembled, together with the tank 3, are suitably secured to each other and the whole suspended as a unit from the uprights 1 by specially formed brackets 23. These brackets are fixed along one edge to the uprights 1, as indicated at 24, and have formed on the opposite edge a series of steps upon which rest the bottoms of the several compartments. Preferably three uprights are used, hence the brackets 23 are spaced 120° apart around the tank, and in order to rigidly position the parts, the brackets are attached to the compartments by the angle irons 25. Such arrangement and means of support provide a construction in which no obstructions are presented to the falling particles in the tank and collecting compartments.

Surrounding the upper edge of the tank is an annular overflow trough 26 provided with a discharge pipe 27. The space at the upper end of the wall 10 is closed by a top, as shown at 28, upon which is mounted a circular distributing disk or table 29 having the raised conical portion 30 at its center for laterally deflecting the material fed thereon in a manner to be presently described. The upper surface of the table or disk beyond the central conical portion is horizontal and is so positioned as to bring such surface substantially coincident with the level of the water within the tank, and the periphery of the table preferably terminates flush with the wall 10.

In order to deposit the material to be treated upon the table 28, a feeding hopper 31 is employed. An emergency overflow trough 32 having the discharge pipe 32' surrounds its upper edge, and the funnel-shaped bottom 33 of the hopper has a delivery nozzle 34 at its central portion which is posititoned just above the raised deflecting portion 30 of the table, the flow through the nozzle being controlled by the size of the nozzle and the hydrostatic head in the hopper 31. The hopper is supported in any suitable manner as by the brackets 36, and suspended centrally within the same is a mixing cone 37, the apex of which lies adjacent the outlet 38 of an auxiliary hopper 39 supported thereabove by means of brackets 40. Any desired number of brackets 36 and 40 may be used, only one, however, being illustrated in the drawings. The mixture of granular materials is supplied to the hopper 39 by means of pipe 41 provided with the valve 42, and leading into the outlet nozzle 38 is a water supply pipe 43 having the control valve 44.

Water is supplied adjacent the bottom of each of the collecting compartments through the pipes 45 to 49 respectively, provided with the respective regulating valves 45' to 49'. Each of said pipes enters the compartment at a tangent, as clearly shown in Fig. 2, for the purpose of producing a current of substantially uniform flow by the time it reaches the upper edge of the compartment, and the width of the several compartments and the quantity of water supplied are such as to cause outwardly flowing radial streams of progressively decreasing velocity from the inner compartment 4 of the periphery of tank 3.

The quantity of water supplied to each individual compartment is also carefully regulated so as to provide uniform upwardly flowing current of sufficient strength, when reaching the top of the compartment, to cause the lighter particles to be deflected into the adjacent compartment.

An effective separation is secured by properly choosing the widths of the compartments, positioning the top of each succeeding compartment below that of the preceding one and gradually decreasing the velocity of the current flowing from the inner compartment to the upper edge of the tank, but the sharpness of this separation is greatly enhanced by properly regulating the flow in each individual compartment to secure the lateral deflection above noted.

In operation, the granular material from which particles above a predetermined maximum size have been removed, is delivered through pipe 41 into the auxiliary hopper 39 and is mixed with water admitted through pipe 43. An intimate mixing of the material and water is secured in passing over the mixing cone 37 and this intimate mixture is deposited upon the table or disk 29 in a comparatively thin sheet from nozzle 34, the water acting as a carrier for the solid particles. The conical center 30 deflects the mixture towards the edge of the table from the periphery of which all of the particles with the water are projected radially at substantially the same uniform velocity. Due to the well known principle previously noted, and because of the progressively decreasing velocity of the stream of water within the tank, the larger and heavier particles fall more rapidly than the smaller and lighter particles, the particles gradually decreasing in size as they approach the bounding wall of the tank. Consequently each compartment will receive particles falling within a certain group depending upon the size of the particles and the specific gravities of the material of which they are composed. As the particles approach the upper end of a compartment and tend to enter the same, due to the upward current therein only the heavier particles are permitted to descend therethrough, besides the laterally and outwardly flowing current from the compartment itself towards the next succeeding compartment deflects many of the lighter and smaller particles to the adjacent compartment thus securing a sharper separation. The combined overflow from the several compartments and tank 3 is discharged through the trough 26 and pipe 27. The classified groups of the material gradually work their way towards the outlets provided adjacent the bottoms of the compartments through which they are discharged. In case the outlet to the hopper 31 should become clogged, or for any other reason water should back up in the hopper, the same will be discharged by the emergency overflow trough 32 and pipe 32'.

Although the apparatus described above, as well as the forms to be subsequently described, employ six collecting compartments, the principle of operation is identically the same regardless of the number of compartments employed, the number used varying according to the characters of the material treated.

The apparatus is particularly useful in treating mixtures of material comprising ingredients which differ in specific gravity for the reason that in such case the size of the particles of the different ingredients forming each group collected by a compartment will also vary considerably in size. Consequently, each group may then be more readily subjected to subsequent treatment in order to separate the several particles according to size, thus providing a very convenient method for ultimately separating each of the several ingredients from the other.

By treating a mixture of ore and gangue, after the proportions of the apparatus and the velocities of flow of the several streams are properly selected, the mixture may be separated into a number of grades, that collected in the innermost compartment being substantially pure ore, that in the next succeeding compartments being mixtures of ore and gangue, the particles of which vary considerably in size, while that passing through the overflow will be composed of particles of extremely small size and practically all gangue, silica, alumina, froth, scum, etc. It is to be noted, however, that although the apparatus is particularly effective for the separation of ores and its gangue, it is also adapted for use generally wherever it is desired to effect a separation of mixed granular materials composed of ingredients having a decided difference in specific gravities.

Fig. 3 illustrates a modified form of the tank and its associated collecting compartments. In this form only the extreme upper portion of the tank is cylindrical in form while the upper portion of each of the walls forming the collecting compartments is funnel-shaped, being flared outwardly. Instead of delivering the water supply to each compartment near its bottom by means of a supply pipe projecting through its walls at a tangent, an annular pipe surrounds the upper outer edge of each of the five innermost walls, such annular supply pipes being indicated at 50, 51, 52, 53 and 54 respectively. These annular supply pipes are provided with a series of small outlet apertures 55 equally spaced around their outer peripheries so as to produce an outwardly radially flowing stream at the top of each collecting compartment towards the adjacent compartment surrounding it. Water is supplied to the pipe 50 by means of a conduit 56, provided with the control valve 57, which extends radially above the tank, and similar conduits 58, 59, 60 and 61, also provided with control valves, deliver water to the pipes 51 to 54 in a like manner. The conduits 57 to 61 are arranged angularly around the top of the tank and are uniformly spaced so as not only to offer the minimum obstruction to the flow of the particles to the several compartments, but to maintain the same as uniform as possible. Parts of this modification, as well as an additional modification to be presently described, common to the several forms are designated by the same reference numerals with the exponent "a" added thereto.

In this modified form of apparatus, due to the introduction of the water supply at the top of the several collecting compartments instead of at their bottoms, no upwardly flowing stream is maintained therein but a slight downward flow is produced in each compartment, sufficient to discharge the material. The laterally flowing stream from each compartment to the next, however, is present as in the form shown in Figs. 1 and 2.

The materials are treated in the same manner as in the previously described form, and the several groups into which the materials separate are caught by the collecting compartments in a like fashion. Due to the location of the supply pipes 50 to 54 at the extreme upper inner edge of each collecting compartment the laterally flowing streams therefrom are depressed slightly downwardly which serves to assist the passage of the heavier particles into the collecting compartments while at the same time laterally deflecting the lighter particles into the next succeeding compartment. In this way the widths of the several collecting compartments can be reduced to some extent which combined with the funnel-shaped upper portions of the walls of the compartments serve to greatly reduce the size of the unit comprising the tank and collecting compartments, consequently reducing the cost of manufacture and at the same time producing a structure which is readily self-cleaning.

In Fig. 5 still another modified form of construction is illustrated. In this modification, the forms of the tank and collecting compartments are identical to those in the modification just previously described, with the exception that instead of feeding the water supply to each of the annular pipes disposed at the top of the collecting compartments by conduits disposed at the top of the tank, the water is delivered by pipes leading upwardly through the several compartments from a manifold. The annular pipes 50, 51, 52, 53 and 54 have leading thereto the conduits 58, 59, 60, 61 and 62 respectively, each of which is equipped with a suitable regulating valve such as indicated at 63. The conduits 58 to 62 are connected to a manifold 64 supplied by pipe 65 in which the control valve 66 is interposed. By supplying the water in this manner the entire space between the inner collecting compartment and the overflow of the tank is unobstructed.

In Fig. 5 is also illustrated one type of settling tank to which the material collected in any of the collecting compartments may be delivered. As shown, the settling tank comprises a cylindrical receptacle 67 having the funnel-shaped bottom 68 gradually sloping toward an outlet pipe 69 leading from its central portion, the pipe 69 being provided with the valve 70. The tank is closed at the top by means of a cover plate 71. Extending through its central portion and to a point slightly below the same, is a dome 72, and depending from the dome and spaced therefrom so as to provide an annular recess 73 is a pipe 74. The lower end of the pipe 74 extends slightly below the main portion of the top or cover 71 and supports a circular disk 75. A water discharge pipe 76 provided with the control valve 77 communicates with the annular space 73, and a vertically extending pipe 78 establishes communication from the top of the tank to a point above the level of the liquid in the main collecting tank 3 for venting purposes. The discharge outlet of the collecting compartment is connected to the settling tank by means of a suitable conduit 79. It will be obvious that each collecting compartment discharges into its individual settling tank such as described.

The material collected in the collecting compartment flows through the pipes 79 and 74 into the tank 67, the solid particles falling to the bottom while the water flows upwardly around the periphery of the disk 75, through the annular space 73, and out through the pipe 76. The solid material settling to the bottom of the tank may be withdrawn from time to time through the pipe 69 and valve 70.

It will be understood that the classifier functions independently of the settling tank, and the contents of the collecting compartments may be otherwise treated to effect a final concentration in any known way. For instance, the discharge may be direct to a concentrator of the type illustrated, in my copending application, Serial No. 541,168, filed March 4, 1922, or to any type of concentrator adapted to separate the ingredients according to their respective sizes.

All of the forms above described have included a distributing table or disk provided with a raised conical deflecting center for feeding the mixture in a thin sheet, and the collecting compartments in each of said forms have been annular and concentrically arranged. It is obvious, however, that the invention may be embodied in an apparatus utilizing other means for feeding the mixture in a thin sheet, and for collecting the several grades or classes into which the material is separated, without departing from the spirit of the invention. Such a form of apparatus is illustrated in Figs. 6 to 8.

In this modification, the tank 80 is rectangular in shape, being provided with a horizontal feeding table 81 disposed adjacent its upper edge and at one side thereof, and with the overflow trough 82 having the discharge pipe 83 at the upper edge of its opposite side, the table 81 and the top of the inner wall of the trough lying in substantially the same horizontal plane.

Disposed within the tank and separating it into a series of collecting compartments are the vertical partitions 84, 85, 86, 87 and 88, these partitions extending completely from one end wall of the tank to the other. The upper edge of the partition 84 extends nearly to the top of the tank, while the upper edges of the partitions 85 to 88 successively terminate in planes located below that of the preceding partition. The spaces between the several partitions form the collecting compartments 89, 90, 91, 92, 93 and 94, each of which is provided with a bottom portion formed of two sections which slope from a point midway between the ends of the tank. The sections forming the bottom of the compartment 89 are indicated at $89^c$ and 89$^d$ which slope downwardly from the apex 89$^e$ formed by their juncture at the center of the compartment. The bottoms of each of the collecting compartments are identical in form being merely located at successively lower elevations, as clearly shown in Figs. 7 and 8. Located at either side of the collecting compartment 89 and disposed at its lowest points are the discharge pipes 89$^a$ and 89$^b$, each of the remaining collecting compartments 90 to 94 being also equipped with similar discharge pipes 90$^a$, 90$^b$, to 94$^a$, 94$^b$, respectively, and each of these several discharge pipes are provided with suitable control valves through which the collected material may be discharged.

Water is supplied to the several compartments and tank through a series of pipes indicated at 95, 96, 97, 98 and 99 provided with the respective control valves 95$^a$, 96$^a$, 97$^a$, 98$^a$ and 99$^a$, all of said pipes extending from a manifold 100 having the cut-off valve 101 interposed in the supply pipe 102 leading to the inlet of the manifold. The pipe 95 extends along the inner upper edge of the compartment 89, and the feed pipes 96, 97, 98 and 99 are likewise positioned at the upper inner edges of the respective collecting compartments 90 to 93. Each of these supply pipes are provided with a series of small equally spaced apertures 103 extending the full width of the tank so as to produce a laterally flowing stream from each collecting compartment to the adjacent compartment in the direction of flow from the compartment 89 to the overflow trough 82.

Suitably supported as by means of braces 104 and 105, upon the distributing table 81, is a feed hopper 106. The hopper 106 has a funnel-shaped lower portion 107 and is equipped with a discharge outlet 108 to which is attached a fan-shaped nozzle 109 provided with the regulating valve 110. The outlet of the nozzle 109 is comparatively narrow and terminates adjacent the surface of the distributing table 81.

In operation, the mixture of water and granular material is delivered from the hopper 106 through the nozzle 109 upon the distributing table 81, and is projected in the form of a thin sheet from the upper edge of the collecting compartment 89 in the direction of overflow trough 82. In falling through the water contained in the tank 80, and due to the encountering of the laterally flowing streams from each collecting compartment to the adjacent compartment, the granular material is separated into a number of grades or classes which fall into the several collecting compartments in a manner similar to that described in connection with the preferred forms of the invention. The material falling within the compartments finally reaches the inclined bottoms and is deflected towards the outlet pipes 89$^a$, 89$^b$, to 94$^a$, 94$^b$, through which it is discharged to suitable devices for effecting the final concentration or separation thereof, as previously described. In this form, also, the widths of the compartments and the disposition of the tops of the same with respect to the adjacent compartments, as well as the velocities of flow of the several streams must be carefully proportioned as set forth in connection with the description of the preferred forms.

Although the invention has been particularly described in connection with the classification of a mixture composed of ingredients differing in both specific gravities and sizes, it is obvious that the apparatus may be used for grading mixtures in which all the particles are of the same material but vary in size, and such as mixtures of sand, abrading materials and the like. It is therefore not intended to limit the invention beyond that specifically pointed out in the appended claims.

It is thus seen that the invention provides an apparatus for readily and efficiently separating the particles comprising a mixture of granular materials into a desired number of grades according to their respective sizes and specific gravities, one which is void of screens and shaking tables, one in which the separated materials will be in a clean state, which possesses a large capacity of production, offers the minimum obstruction to the passage of the materials into the compartments collecting the segregated particles, and one which may be economically manufactured.

I claim:—

1. An apparatus for grading granular material according to the size and specific gravities of the particles composing the same, comprising a tank which is constantly filled with water, means for admitting water to the tank to produce a radially flowing stream of progressively decreasing velocity towards its periphery, means for feeding material at the center of the tank, means for laterally deflecting the material towards the said periphery through the water contained therein, the space between the feeding means and the periphery of the tank being unobstructed and free of deflecting parts whereby to permit a substantially horizontal flow therebetween, and a plurality of collecting compartments positioned below the said feeding means and disposed at varying distances therefrom, the tops of said compartments terminating below the level of the water maintained in the said tank.

2. An apparatus for grading granular material according to the size and specific gravities of the particles composing the same, comprising a tank which is constantly filled with water, means for admitting water to the tank to produce a flowing stream of progressively decreasing velocity towards its edge, a distributing table adjacent the level of the water in the tank, the space between the table and said edge being unobstructed whereby to permit a substantially horizontal flow therebetween, means for feeding the material on to said table, a plurality of collecting compartments submerged in the water in said tank positioned below the said table and disposed at varying distances therefrom.

3. An apparatus for grading granular material according to the size and specific gravities of the particles composing the same, comprising a tank which is constantly filled with water, a series of concentrically disposed collecting compartments submerged in said tank, means for admitting water to the tank to produce a radially flowing stream of progressively decreasing velocity towards its periphery, a distributing table coaxial with the said compartments and disposed above the same and coincident with the surface of the water in the tank, the space between the table and the periphery of the tank being unobstructed whereby to permit substantially horizontal flow therebetween, the center of the table being provided with a conical deflecting portion extending above the level of the water, means for feeding granular material on the said conical portion and means for withdrawing the water around the peripheral edge of the tank.

4. An apparatus for grading granular material according to the size and specific gravities of the particles composing the same, comprising a tank which is constantly filled with water, a series of concentrically disposed collecting compartments submerged in said tank, said compartments progressively decreasing in height from the inner to the outermost compartment, means for admitting water to the tank to produce a radially flowing stream of progressively decreasing velocity towards its bounding wall, a circular distributing table the periphery of which terminates adjacent the inner wall of the innermost compartment and disposed with its upper surface coincident with the upper level of the water within the tank, the space between the table and the said bounding wall being unobstructed whereby to permit substantially horizontal flow therebetween, the central portion of the table being provided with a raised conical deflecting surface, means for feeding the material upon the table, and means for withdrawing the water around the upper edge of the tank.

5. An apparatus for grading granular material according to the size and specific gravities of the particles composing the same, comprising a tank which is constantly filled with water, a series of concentrically disposed collecting compartments submerged in said tank, means for admitting water to the tank to produce a radially flowing stream of progressively decreasing velocity towards its bounding wall, a distributing table coaxial with the said compartments disposed above the same and coincident with the surface of the water in the tank, the space between the table and the said bounding wall of the tank being unobstructed whereby to permit substantially horizontal flow therebetween, the center of the table being provided with a conical deflecting portion extending above the level of the water, means for feeding granular material on the said conical portion, means for withdrawing the water around the peripheral edge of the tank, the water admitting means being so disposed as to produce an outwardly flowing lateral current from the top of each collecting compartment to the adjacent compartment whereby to deflect the lighter particles falling therethrough into the said adjacent compartment.

6. An apparatus for grading granular material according to the size and specific gravity of the particles composing the same, comprising a tank which is constantly filled with water, a series of concentrically disposed compartments submerged in the said tank, said compartments progressively decreasing in height from the inner to the outermost compartment, the tops of successive compartments being disposed at gradually increasing depths below the level of the water maintained in the tank, means for admitting water to the tank from each of said compartments to produce a radially flowing stream of progressively decreasing velocity towards its bounding wall, said water admitting means being so disposed as to produce an outwardly flowing lateral current from the top of each collecting compartment to the adjacent compartment whereby to deflect the lighter particles falling therethrough into the next compartment, a circular distributing table the periphery of which terminates adjacent the inner wall of the innermost compartment and disposed with its upper surface coincident with the level of the water within the tank, the space between the table and the said bounding wall being unobstructed whereby to permit substantially horizontal flow therebetween, the central portion of the table being provided with a raised conical deflecting surface, means for feeding material upon the table, and means for withdrawing the water around the upper edge of the tank.

7. An apparatus for grading granular material according to size and specific gravity of the particles composing the same, comprising a tank which is constantly filled with water, an overflow trough surrounding the upper edge of the tank, a plurality of concentrically disposed collecting compartments submerged in said tank, the upper edges of which terminate in progressively lower planes and at progressively increasing depths below the level of the water in the tank, means for admitting water to the said compartments and tank to produce a radially flowing stream of progressively decreasing velocity towards the said overflow trough, said water admitting means being so disposed as to produce an outwardly flowing lateral current from the top of each collecting compartment to the adjacent compartment whereby to deflect the lighter particles falling therethrough into the next compartment, a circular distributing table disposed above and having its periphery terminating at the inner wall of the innermost compartment, the space between the table and the said overflow trough being unobstructed whereby to permit substantially horizontal free flow therebetween, the central portion of the table being provided with a raised deflecting surface, a mixing device above the table for feeding the material onto the same, and means for regulating the flow of water from the top of each compartment to the top of the compartment adjacent thereto.

8. An apparatus for grading granular materials comprising a tank which is constantly filled with water, a series of spaced collecting compartments submerged within the tank, said compartments progressively decreasing in height from the inner to the outermost compartment and having their upper edges disposed at progressively increasing depths below the level of the water maintained in the tank, means for admitting water to said compartments and tank, the water admitting means being so disposed as to produce a laterally flowing current from the top of each collecting compartment to the next succeeding outer compartment whereby to deflect the lighter particles falling therethrough into the adjacent compartment, and means for feeding the material to be treated in a thin sheet at the inner upper edge of the inner compartment towards the outermost compartment, the space within the interior of the tank above the said compartments being unobstructed whereby to permit free flow in a substantially horizontal direction from the inner compartment towards the said outer compartment.

In testimony whereof, I sign my name.

MARTIN HOKANSON.

Witnesses:
JOHN D. PATTERSON,
P. E. LE PAK.